US008451776B2

(12) United States Patent  
Dayal et al.

(10) Patent No.: US 8,451,776 B2
(45) Date of Patent: May 28, 2013

(54) METHOD AND APPARATUS TO FACILITATE SUPPORT FOR MULTI-RADIO COEXISTENCE

(75) Inventors: Pranav Dayal, San Diego, CA (US); Ashok Mantravadi, San Diego, CA (US); Tamer Adel Kadous, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 12/851,334

(22) Filed: Aug. 5, 2010

(65) Prior Publication Data

US 2011/0243047 A1 Oct. 6, 2011

Related U.S. Application Data

(60) Provisional application No. 61/319,322, filed on Mar. 31, 2010, provisional application No. 61/356,933, filed on Jun. 21, 2010, provisional application No. 61/356,960, filed on Jun. 21, 2010.

(51) Int. Cl.
*H04Q 7/00* (2006.01)
*H04Q 7/24* (2006.01)

(52) U.S. Cl.
USPC .......................................... 370/328; 370/338

(58) Field of Classification Search
USPC ......................................... 370/328–331, 338
See application file for complete search history.

(56) References Cited

U.S. PATENT DOCUMENTS

| 6,930,993 | B1 | 8/2005 | Hamada et al. | |
| 7,787,398 | B2 * | 8/2010 | Liu et al. | 370/254 |
| 7,907,572 | B2 * | 3/2011 | Yang et al. | 370/332 |
| 7,929,432 | B2 * | 4/2011 | Zhu et al. | 370/229 |
| 8,059,622 | B2 * | 11/2011 | Zhu | 370/338 |
| 8,116,319 | B2 * | 2/2012 | Yoon et al. | 370/395.5 |
| 8,160,001 | B2 | 4/2012 | Bitran | |
| 8,218,487 | B2 | 7/2012 | Eliezer et al. | |
| 2002/0071404 | A1 | 6/2002 | Park et al. | |

(Continued)

FOREIGN PATENT DOCUMENTS

WO WO2009137295 A2 11/2009

OTHER PUBLICATIONS

3rd Generation Partnership Project; Technical Specification Group Radio Access Network; Evolved Universal Terrestrial Radio Access (E-UTRA); Physical Channels and Modulation (Release 9), 3GPP Standard; 3GPP TS 36.211, 3rd Generation Partnership Project (3GPP), Mobile Competence Centre; 650, Route Des Lucioles; F-06921 Sophia-Antipolis Cedex; France, No. V9.0.0, Dec. 10, 2009, pp. 1-85, XP050400685 [retrieved on Dec. 10, 2009].

(Continued)

*Primary Examiner* — Hong Cho
(74) *Attorney, Agent, or Firm* — Rupit M. Patel

(57) ABSTRACT

A method includes identifying coexistence issues among radios in a User Equipment (UE). The method also includes submitting a message to a base station that requests reconfiguring of a timing schedule of a first one of the supported radios to provide for periods of inactivity of the first one of the supported radios. The inactive periods provide operating periods for at least a second one of the supported radios. The inactive periods may be measurement gaps.

27 Claims, 15 Drawing Sheets

U.S. PATENT DOCUMENTS

| | | | |
|---|---|---|---|
| 2007/0054620 | A1 | 3/2007 | Zeira et al. |
| 2007/0291673 | A1* | 12/2007 | Demirhan et al. ............ 370/311 |
| 2008/0181179 | A1 | 7/2008 | Karaoguz |
| 2008/0240021 | A1* | 10/2008 | Guo et al. .................... 370/328 |
| 2009/0213773 | A1* | 8/2009 | Yoon et al. ................... 370/311 |
| 2010/0061326 | A1 | 3/2010 | Lee et al. |
| 2010/0067469 | A1 | 3/2010 | Gaal et al. |
| 2011/0243094 | A1 | 10/2011 | Dayal et al. |

OTHER PUBLICATIONS

CMCC: "Addition of LTE UE RF requirements for coexistence with WLAN", 3GPP Draft; R4-100707, 3rd Generation Partnership Project (3GPP), Mobile Competence Centre ; 650, Route Des Lucioles; F-06921 Sophia-Antipolis Cedex ; France, vol. RAN WG4, No. San Francisco, USA; 20100222, Feb. 16, 2010, XP050426101, [retrieved on Feb. 16, 2010]the whole document.

CMCC: "Coexistence studies between LTE and WLAN", 3GPP Draft: R4-100706, 3rd Generation Partnership Project (3GPP), Mobile Competence Centre; 650, Route Des Lucioles; F-06921 Sophia-Antipolis Cedex; France, vol. RAN WG4, No. San Francisco, USA; 20100222, Feb. 16, 2010, XP050426100, [retrieved on Feb. 16, 2010].

International Search Report and Written Opinion—PCT/US2011/030531, ISA/EPO—Jun. 27, 2011.

* cited by examiner

METHOD AND APPARATUS TO FACILITATE SUPPORT FOR MULTI-RADIO COEXISTENCE

CROSS-REFERENCE TO RELATED APPLICATIONS

The present application claims the benefit of U.S. Provisional Patent Application No. 61/319,322, filed Mar. 31, 2010, entitled "METHOD AND APPARATUS TO FACILITATE LTE SUPPORT FOR MULTI-RADIO COEXISTENCE," U.S. Provisional Patent Application No. 61/356,933 filed Jun. 21, 2010, entitled "METHOD AND APPARATUS TO FACILITATE SUPPORT FOR MULTI-RADIO COEXISTENCE," and U.S. Provisional Patent Application No. 61/356,960 filed Jun. 21, 2010, entitled "METHOD AND APPARATUS TO FACILITATE LTE SUPPORT FOR MULTI-RADIO COEXISTENCE," the disclosures of which are expressly incorporated by reference herein in their entirety. The present application is also related to U.S. patent application Ser. No. 12/851,302, filed Aug. 5, 2010 and entitled "METHOD AND APPARATUS TO FACILITATE SUPPORT FOR MULTI-RADIO COEXISTENCE," the disclosure of which is expressly incorporated by reference herein in its entirety.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a position location, e.g., Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith The concept of coexistence addresses techniques for operating multiple radios in the same device in a manner that reduces or minimizes interference therebetween. Coexistence issues exist when radios see interference from each other. It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with position location. Currently, there is no mechanism that can solve this issue because LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channels based on Reference Signal Received Power (RSRP) to the eNB. Hence, a ping-pong effect of being transferred back and forth between the corrupted channel and the desired channel can happen if the eNB uses RSRP reports to inform handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency of other radios at the UE.

BRIEF SUMMARY

According to one aspect, a method for use in a wireless communication system includes identifying coexistence issues among radios in a User Equipment (UE). The method also includes submitting a first message to a base station that affects reconfiguration of a timing schedule of a first one of the radios to provide for periods of inactivity of the first one of the radios. The inactivity periods provide operating periods for at least a second one of the radios.

In another aspect, a User Equipment (UE) for use in a wireless communication system includes a memory, and a processor coupled to the memory. The processor is configured to identify coexistence issues among radios in a User Equipment (UE). The processor is also configured to submit a first message to a base station that affects reconfiguration of a timing schedule of a first one of the radios to provide for periods of inactivity of the first one of the radios. The inactivity periods provide operating periods for at least a second one of the radios.

In yet another aspect, a computer readable medium tangibly stores program code. The code identifies coexistence issues among radios in a User Equipment (UE). The code also submits a first message to a base station that affects reconfiguration of a timing schedule of a first one of the radios to provide for periods of inactivity of the first one of the radios. The inactivity periods provide operating periods for at least a second one of the radios.

In still another aspect, a wireless communication system has means for identifying coexistence issues among radios in a User Equipment (UE). The system also has means for submitting a first message to a base station that affects reconfiguration of a timing schedule of a first one of the radios to provide for periods of inactivity of the first one of the radios. The inactivity periods provide operating periods for at least a second one of the radios.

In another aspect, a method for communicating in a wireless communication system includes receiving a coexistence indication message from a user equipment (UE) having multiple radios. The coexistence indication message indicates a coexistence issue for at least one of the radios of the UE. The method also includes providing periods of inactivity for at least one of the radios of the UE, associated with the coexistence issue, in response to receiving the coexistence indication.

According to another aspect, a wireless communication system has means for receiving a coexistence indication message from a user equipment (UE) having multiple radios. The coexistence indication message indicates a coexistence issue for at least one of the radios of the UE. The system also has means for providing periods of inactivity for at least one of the radios of the UE, associated with the coexistence issue, in response to receiving the coexistence indication.

In a further aspect, a base station for use in a wireless communication system has a memory and a processor coupled to the memory. The processor is configured to receive a coexistence indication message from a user equipment (UE) having multiple radios. The coexistence indication message indicates a coexistence issue for at least one of the radios of the UE. The processor is also configured to provide periods of inactivity for at least one of the radios of the UE, associated with the coexistence issue, in response to receiving the coexistence indication

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
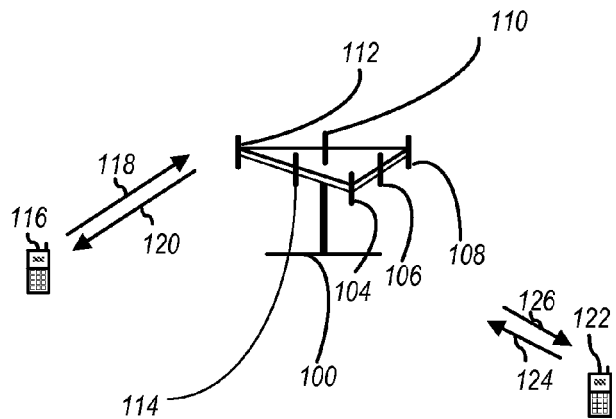
FIG. 1 illustrates a multiple access wireless communication system according to one aspect.

Various aspects of the disclosure provide techniques to mitigate coexistence issues in multi-radio devices. As explained above, some coexistence issues persist because an eNB is not aware of interference on the UE side that is experienced by other radios. According to one aspect, a UE identifies existing or potential coexistence issues and sends a message to the eNB. The message requests one or more parameters to reconfigure a timing schedule of an LTE radio to provide for periods of inactivity of the LTE radio during which another radio can operate. The message to the eNB can include an identification of resources experiencing coexistence issues, an identification of desired parameters, a reason for the coexistence issues, or any other helpful information. If the eNB then grants the request, the UE configures its timing according to the parameters.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). cdma2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
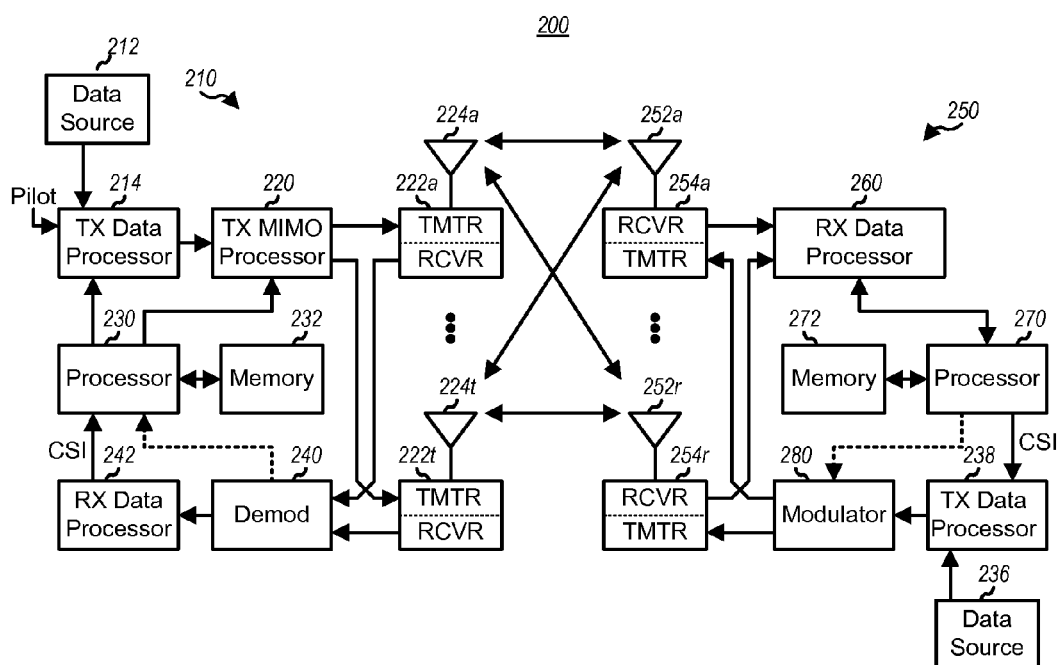
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, in which $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
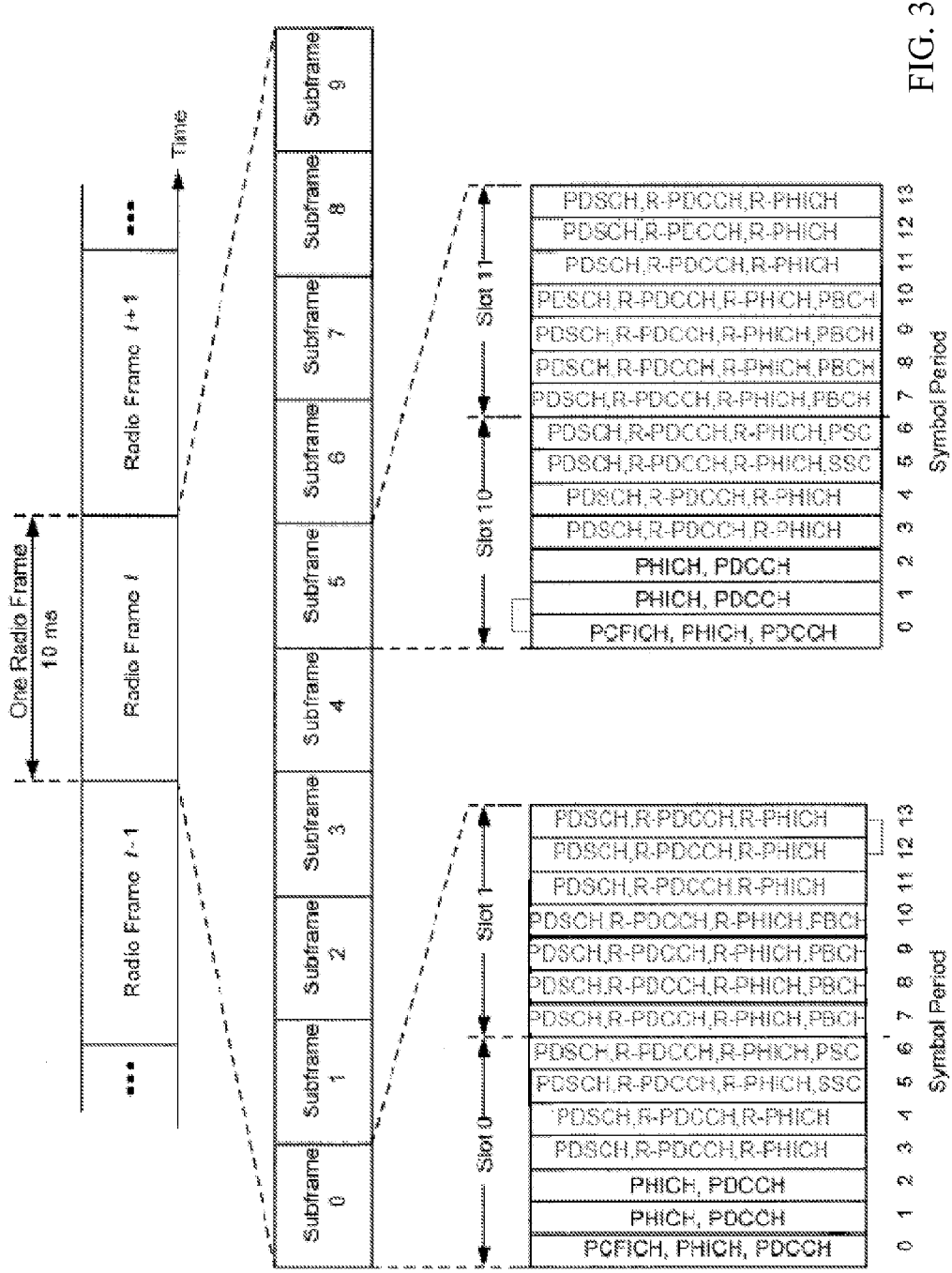
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARM). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
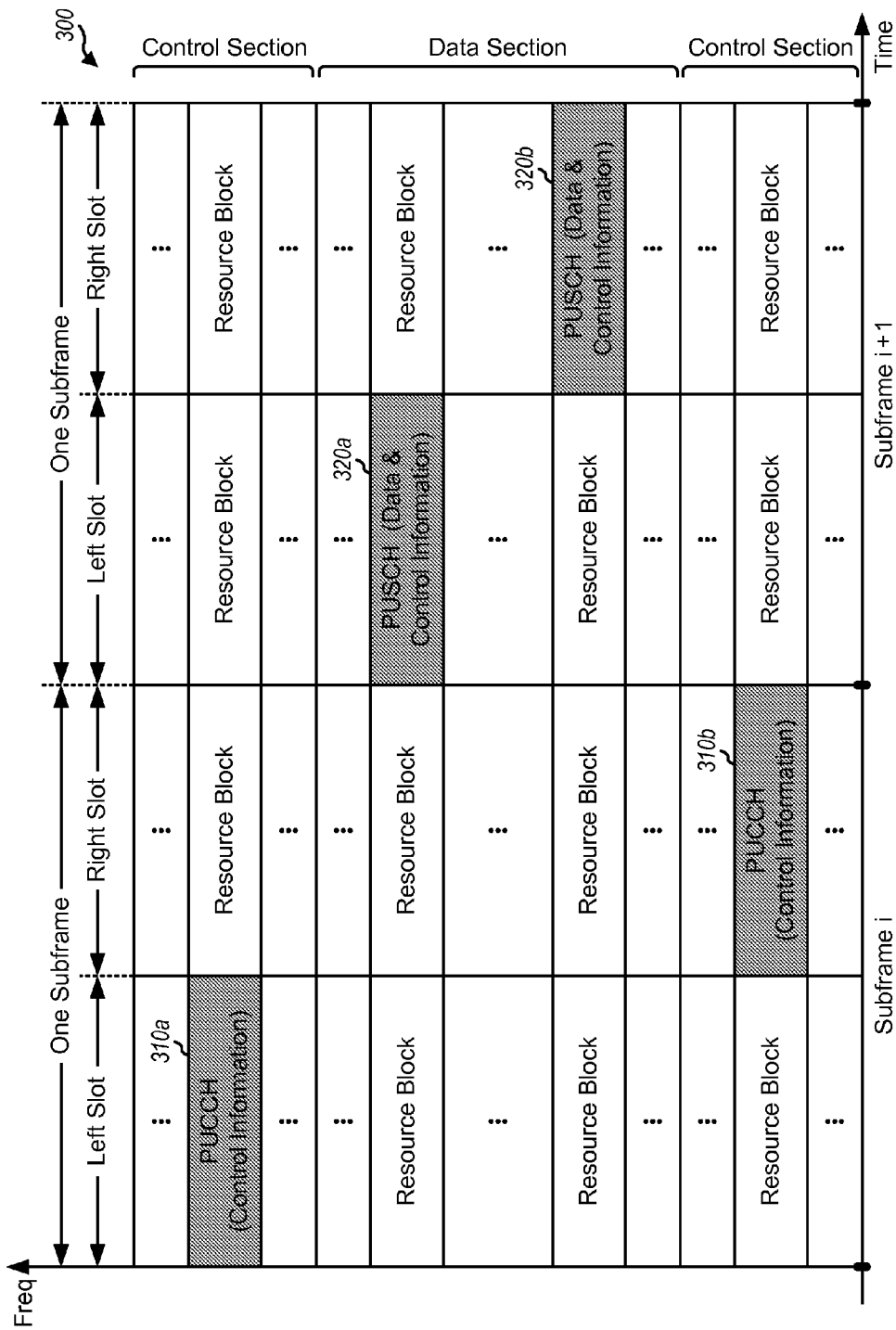
FIG. 4 is a block diagram conceptually illustrating an exemplary frame structure in uplink Long Term Evolution (LTE) communications.

FIG. 4 is a block diagram conceptually illustrating an exemplary frame structure 300 in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
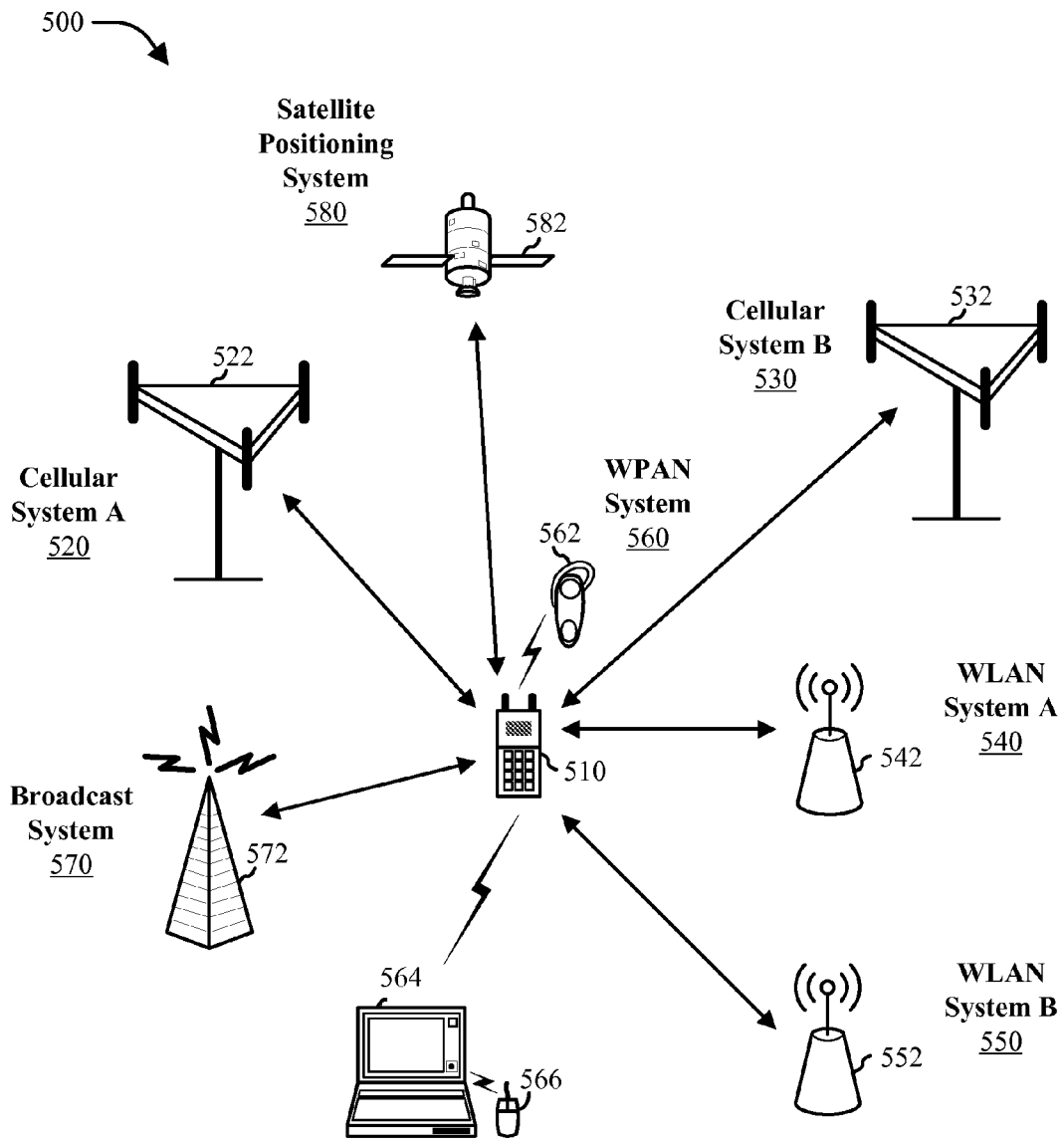
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices (s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, the wireless device 510 includes a coexistence manager (CxM, not shown) that has a functional module to detect and mitigate coexistence issues, as explained further below.

Figure 6:
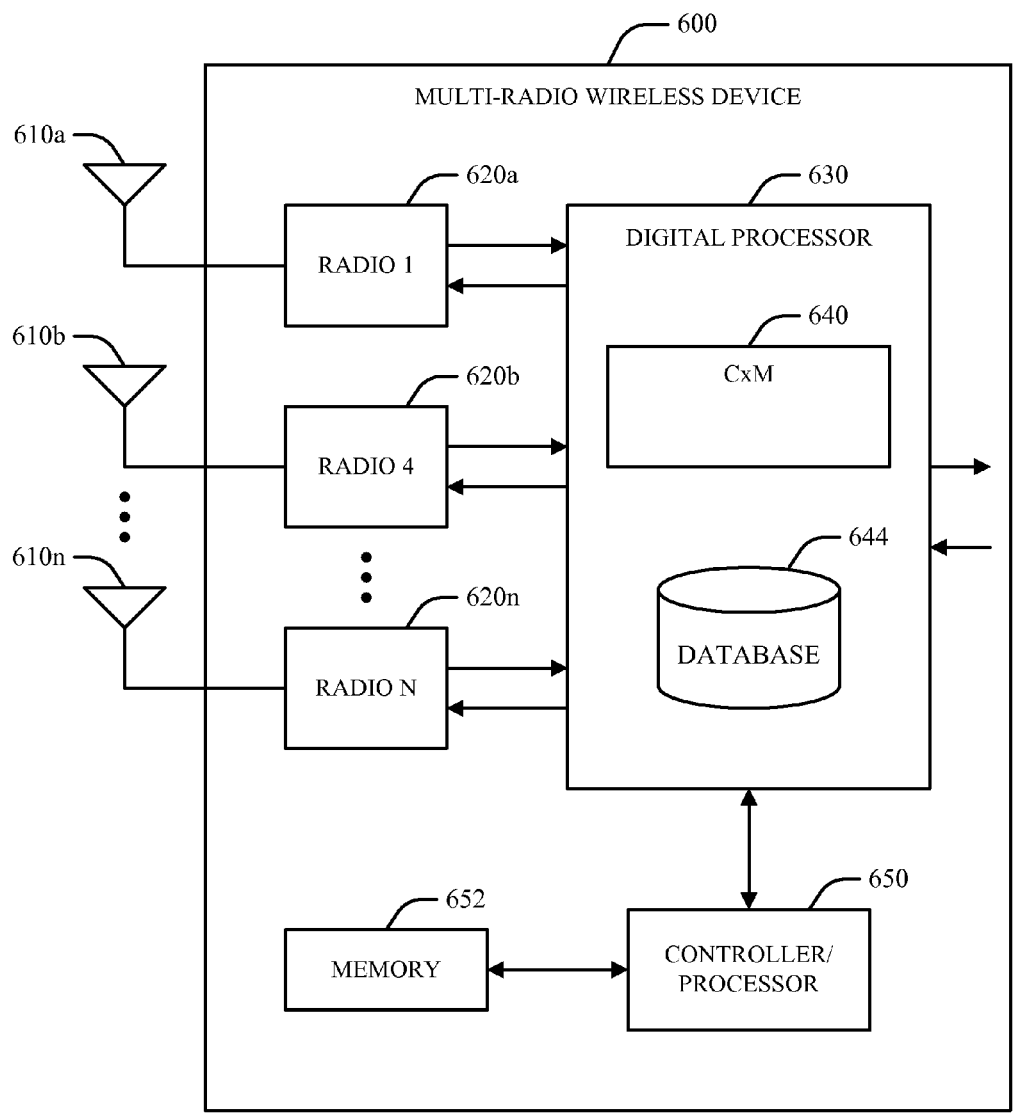
FIG. 6 is a block diagram of an example design for a multi-radio wireless device.

Turning next to FIG. 6, a block diagram is provided that illustrates an example design for a multi-radio wireless device 600 and may be used as an implementation of the wireless device 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
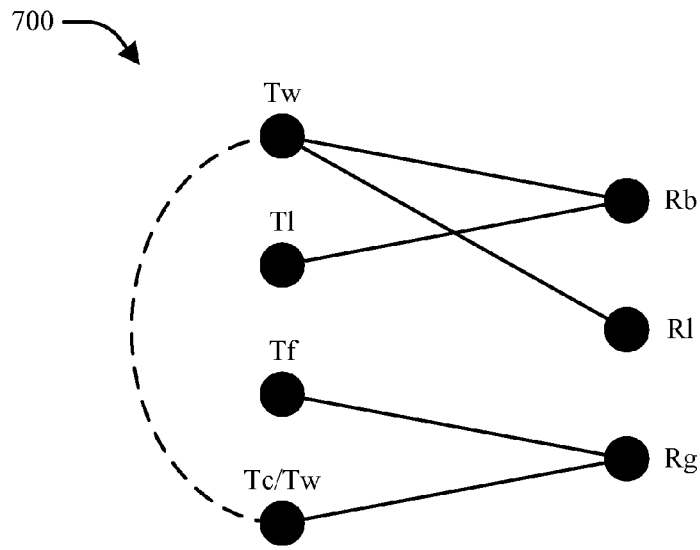
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as those illustrated in FIGS. 11, 13, and 14. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
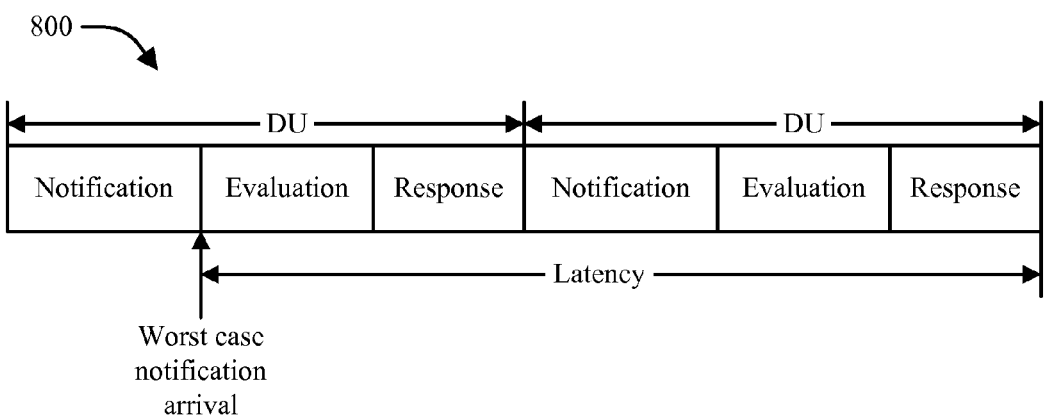
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 μs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

In-device coexistence problems can exist for a UE between resources such as, for example, LTE and ISM bands (e.g., for Bluetooth/WLAN). In current LTE implementations, any interference issues to LTE are reflected in the DL measurements (e.g., Reference Signal Received Quality (RSRQ) metrics, etc.) reported by the UE and/or the DL error rate which the eNB can use to make inter-frequency or inter-RAT handoff decisions to, e.g., move LTE to a channel or RAT with no coexistence issues. However, it can be appreciated that these existing techniques will not work if, for example, the LTE UL is causing interference to Bluetooth/WLAN but the LTE DL does not see any interference from Bluetooth/WLAN. More particularly, even if the UE autonomously moves itself to another channel on the UL, the eNB can in some cases handover the UE back to the problematic channel for load balancing purposes. In any case, it can be appreciated that existing techniques do not facilitate use of the bandwidth of the problematic channel in the most efficient way.

Figure 9:
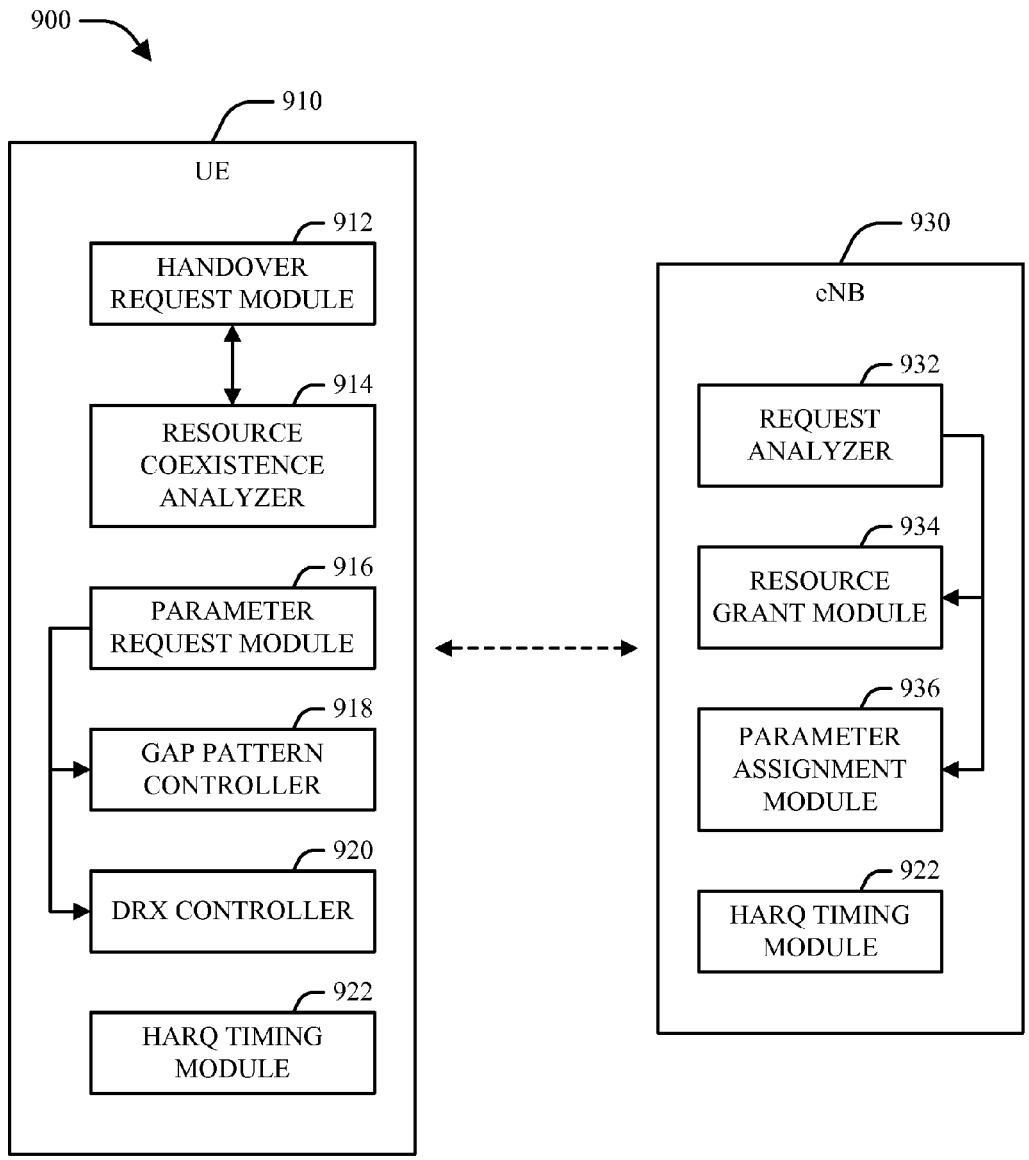
FIG. 9 is a block diagram of a system for providing support within a wireless communication environment for multi-radio coexistence management according to one aspect.

Turning now to FIG. 9, a block diagram of a system 900 for providing support within a wireless communication environment for multi-radio coexistence management is illustrated. In an aspect, the system 900 can include one or more UEs 910 and/or eNBs 930, which can engage in UL, DL, and/or any other suitable communication with each other and/or any other entities in the system 900. In one example, the UE 910 and/or eNB 930 can be operable to conduct communication using a variety of radio technologies and/or resources, some of which can potentially be colliding. Thus, the UE 910 can utilize various techniques for managing coexistence between multiple radios utilized by the UE 910, as generally described herein.

To mitigate at least the above shortcomings, the UE 910 can utilize respective features described herein and illustrated by the system 900 to facilitate support for multi-radio coexistence within the UE 910. According to various aspects disclosed herein, a UE may request timing schedules from the eNB that allow another radio, such as a Bluetooth radio, to be active during times when LTE communications of the UE are inactive.

In one example, a new message can be provided from the UE to the eNB that allows the UE to request parameters or a range of parameters associated with a measurement gap pattern and/or a discontinuous reception (DRX) mode. The message can also indicate release of these settings. In another example, new specific gap patterns are described for Time Division Multiplexing (TDM) solutions between LTE and BT/WLAN. New specific DRX mode parameters are also described. In another example, UL HARQ can be modified at the UE and eNB to prevent UE transmissions beyond an active time in DRX.

In a first aspect, a handover request module 912 and/or other mechanisms associated with the UE 910 can be configured to provide a message to the eNB 930 that allows the UE 910 to request an inter-frequency or inter-RAT handover. Such aspect is described in more detail in United State patent application Ser. No. 12/851,302, filed concurrently herewith and entitled "METHOD AND APPARATUS TO FACILITATE SUPPORT FOR MULTI-RADIO COEXISTENCE," the disclosure of which is expressly incorporated by reference herein in its entirety.

In a second aspect, a parameter request module 916 and/or other mechanisms associated with the UE 910 can be configured to provide a message to the eNB 930 that allows the UE 910 to request the parameters and/or a range of parameters associated with the measurement gap pattern and/or DRX mode used within the system 900. In one example, such a message can also indicate release of these settings, such as when a coexistence issue has passed.

With respect to messages provided by the handover request module 912 and/or parameter request module 916 to eNB 930, a request analyzer 932 and/or other means associated with the eNB 930 can analyze a received request and determine whether a UE 910 from which the request is received is utilizing a problematic frequency band and/or other resources. In the event the UE 910 is determined to be utilizing problematic resources, a resource grant module 934 and/or a parameter assignment module 936 can be utilized by the eNB 930 to grant resources associated with a requested handover and/or a requested set of measurement gap or DRX parameters, respectively.

In a third aspect, a gap pattern controller 918 and/or other mechanisms associated with the UE 910 can utilize one or more new specific gap patterns (e.g., as obtained via the parameter request module 916 or other appropriate means), which can be provided for, e.g., TDM solutions between LTE and Bluetooth/WLAN.

Similarly, in a fourth aspect, a DRX controller 918 and/or other mechanisms associated with the UE 910 can facilitate operation of the UE 910 according to one or more new specific DRX mode parameters (e.g., as obtained via the parameter request module 916 or other appropriate means).

In a fifth aspect, UL HARQ can be modified at the UE 910 and/or the eNB 930 (e.g., via a HARQ timing module 922 at UE 910 and/or the eNB 930) in order to prevent transmissions by the UE 910 beyond a predefined time in DRX.

Conventional LTE provides for measurement gaps. An eNB may instruct a UE to be silent (i.e., no uplink or downlink communications) every so many milliseconds of a cycle. Gaps currently provided for include 6 ms out of every 40 ms and 6 ms out of every 80 ms. During the measurement gap, the UE measures interfering signals in various channels. The UE then reports the information to the eNB, and the eNB uses the reported information, e.g., to handover the LTE communications of the UE to another channel that should be expected to experience less interference. Measurement gap configuration is initiated by the eNB in conventional LTE systems.

In some aspects, new gap patterns are defined for the measurement gaps, where such new gap patterns provide evenly-distributed gaps that can be utilized by another radio. One example pattern includes 20 ms out of 40 ms, and another example includes 30 ms out of 60 ms. In such example gap patterns, half of each cycle is a measurement gap and can be used by other radios. For instance, according to one example, 20 ms of every 40 ms period can be used by a Bluetooth radio (and/or other radios) without LTE interference. Examples for implementing such measurement gap patterns are described in more detail below. In another aspect, measurement gap patterns can be configured in a process initiated by a UE, which contrasts with conventional LTE systems which only allow eNB initiation of measurement gap configuration.

Figure 10:
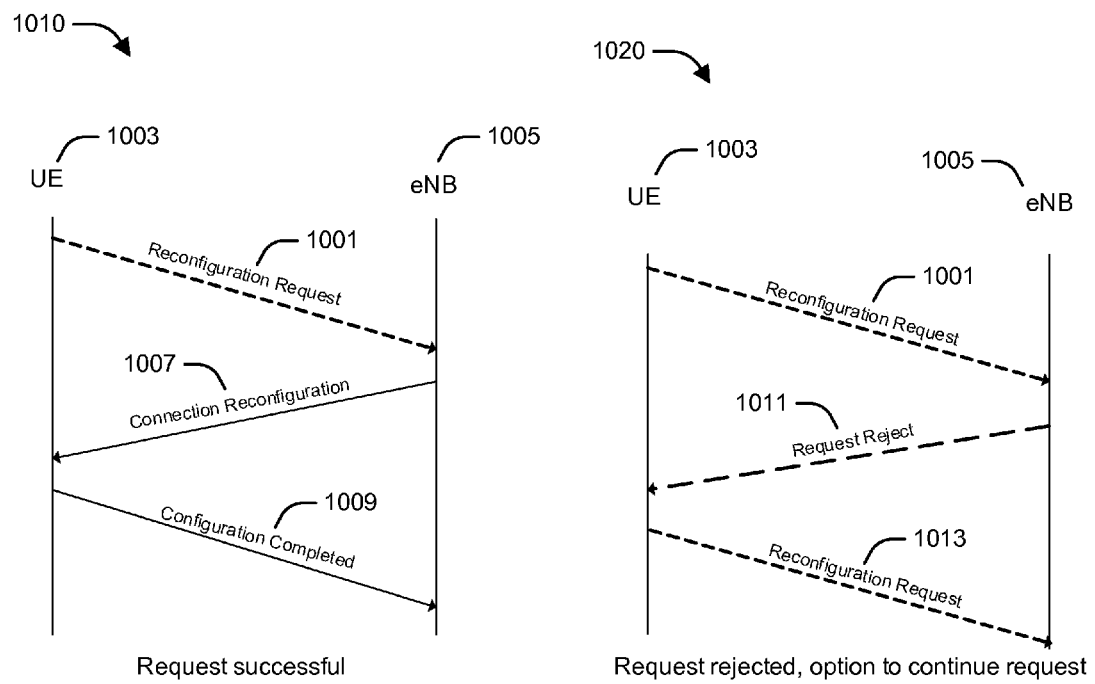
FIG. 10 illustrates example call flow diagrams showing use of messages according to one aspect of the disclosure.

FIG. 10 illustrates example call flow diagrams 1010, 1020 showing use of messages according to one aspect. In this example, new tools are added to the Radio Resource Control (RRC) connection messaging that is provided by conventional LTE. RRC protocol handles the Layer 3 control plane signaling and controls behavior of the UE 1003 including System Information (SI) broadcasting, connection control such as handover within LTE, network-controlled inter-Radio Access Technology (RAT) mobility and measurement configuration and reporting. In one instance, an RRCConnectionRequest message (not shown) is sent from a UE to an eNB to initiate an LTE communication.

In one aspect, a new reconfiguration request message 1001 (e.g., a RRCConnectionReconfigurationRequest message) is added to an LTE communication system and is sent from a UE 1003 to an eNB 1005 to initiate a reconfiguration of measurement gaps. In the scenario 1010, a measurement gap reconfiguration request is sent from the UE 1003 to the eNB 1005, and the request is successful. Specifically, the reconfiguration request message 1001 is sent to the eNB 1005 to initiate a measurement gap reconfiguration. The reconfiguration request message 1001 can include a reason for the request (e.g., Bluetooth ON), a range of requested parameters (e.g., indications of one or more requested measurement gap patterns), and/or any other useful information.

The eNB 1005 processes the request. In some aspects, when it is indicated that the UE 1003 has coexistence issues, the eNB grants the request if the requested configuration is possible. In the scenario 1010, the eNB 1005 grants the request by adopting the proposed measurement gap pattern. The connection reconfiguration message 1007 (e.g., a RRCConnectionReconfiguration message) is sent from the eNB 1005 to the UE 1003 informing the UE 1003, e.g., of the request grant and instructing the UE to conform to the measurement gap pattern. The UE 1003 then reconfigures its parameters, and when it has completed reconfiguration, the UE 1003 sends the configuration completed message 1009 (e.g., a RRCConnectionReconfigurationComplete message) back to the eNB 1005.

The process illustrated in the scenario 1010 differs from conventional LTE processes. For instance, the UE 1003 is given some ability to direct its own operation through use of the reconfiguration request message 1001, which can suggest parameters to help resolve a coexistence issue. Additionally, when interference affects an uplink signal but not a downlink signal (and, thus, the eNB 1005 is unaware of the coexistence issue), the UE 1003 initiates the reconfiguration, thereby assuring action is taken in response to the coexistence issue. By contrast, in conventional LTE only the eNB 1005 initiates configuration of measurement gaps. Also, the eNB 1005 is given more information regarding interference than in some conventional LTE systems. For instance, in conventional systems, there is no technique for the eNB to become aware of the timing of other radios in a UE or to become aware that another UE radio has turned ON/OFF. In various aspects of the disclosure, the reconfiguration request and/or other signaling from the UE can provide such information to the eNB.

In the scenario 1020, the eNB 1005 rejects the reconfiguration request in message 1001. The eNB 1005 sends a request reject message 1011 (e.g., a RRCConnectionReconfigurationRequestReject message) to the UE 1003 informing the UE 1003 that the request is rejected. The UE 1003 can then send a follow-up reconfiguration request message 1013 to either request the same parameters again or to request parameters different than in the first request. In one example, when a request for a measurement gap reconfiguration is rejected, the UE 1003 may follow up by requesting a different measurement gap pattern.

Various examples can be adapted for any of a variety of scenarios that may occur during LTE operation. For instance, when an RRC connection is not already in place, a connection request message (e.g., a RRCConnectionRequest message, not shown) can include much of the information discussed above (e.g., requested parameters, a reason for the request, etc.). The eNB uses the information in the connection request message to know that a coexistence issue exists and to assign a configuration to the UE to reduce or minimize coexistence issues when LTE activity is initiated.

An example of when an RRC connection is not already in place includes a scenario when a user is not currently making a phone call. When the user places the call, the RRC connection is established. An example of when an RRC connection is in place includes a scenario when a user is currently on an established call. In either case, an appropriate message is selected based on whether the RRC connection is in place. Also in either case, if the user uses Bluetooth while on the call, coexistence issues may present themselves.

In yet another example, the UE 1003 can be configured to send a message to the eNB when certain events occur. For instance, if an LTE transfer is ongoing and another radio transfer becomes active (e.g., Bluetooth), the UE 1003 can send a reconfiguration request message. If another radio transfer is ongoing (e.g., Bluetooth) and LTE becomes active, a connection request message can be sent that includes a request for certain parameters. Furthermore, after a condition terminates (e.g., after Bluetooth or WLAN turns off), a message (not shown) may be sent by the UE 1003 to the eNB 1005 alerting the eNB 1005 that the coexistence issue no longer exists. Such message may be referred to as a "release indication" in some examples.

Configuration of measurement gap patterns is one example of a technique that can be used to provide TDM mitigation of coexistence issues. Another example includes setting Discontinuous Reception (DRX) timing parameters to facilitate other radio communication when LTE communication is inactive.

Figure 11:
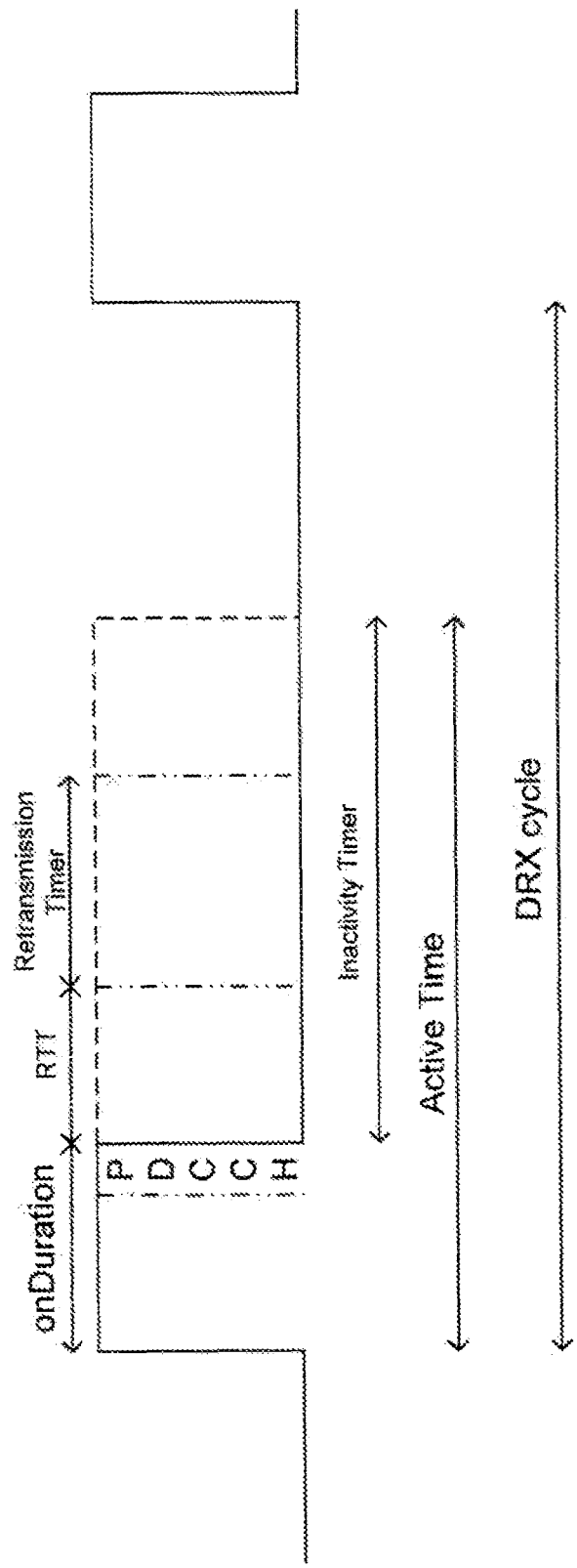
FIG. 11 is a diagram showing a DRX cycle according to conventional LTE communications.

FIG. 11 is an example of a DRX timing diagram according to conventional LTE. DRX includes the periodic switching off of an LTE receiver on the downlink, usually for power saving purposes. In conventional LTE, an eNB configures a DRX cycle for a UE. During the DRX cycle, the eNB knows times when the UE is on and listens for downlink communication and when the UE is off and does not listen for downlink communications. Uplink communications may proceed, even if the downlink communications are in an off period.

In FIG. 11, a full DRX cycle is labeled. During the onDuration, downlink communications are active and occur as they would in non-DRX communications. The PDCCH may include, e.g., a downlink grant, a PHICH, or the like.

However, the UE does not stop downlink communications entirely after the onDuration concludes. The active time includes both the onDuration and an inactivity timer, where the inactivity timer provides a reduced or minimum number of subframes where downlink communications may be possible from the eNB to the UE and the UE stays awake during this period. The active time is the portion of the total DRX cycle when the UE does not shut itself down.

For purposes of this discussion, the following parameters apply. The onDurationTimer is a number of subframes the UE shall monitor in a DRX cycle, and it defines the onDuration. The drx-InactivityTimer is a number of consecutive subframes that the UE monitors after receiving an initial uplink or downlink assignment, and it defines the inactivity period. The HARQ RTTtimer is the minimum number of subframes before retransmission is expected (e.g., 8 for FDD; >8 for TDD). The drx-RetransmissionTimer is the maximum number of subframes for the UE to monitor after HARQ RTT. The drxStartOffset parameter specifies an offset subframe where onDuration starts. ShortDRX-Cycle and LongDRXCycle are lengths of short and long DRX periods between onDuration times. FIG. 11 shows only a long DRX cycle. The drxShortCycleTimer is the number of subframes to follow a short DRX before switching to long DRX.

An example of how the times in FIG. 11 are used is illustrative. If the PDCCH gives a downlink grant, but the grant is not successful, then the UE sends a NACK in the RTT period (four subframes later). Then four additional subframes later, a retransmission is sent from the eNB during the retransmission timer period.

In another instance, if no downlink grant is received, the UE stays on for a period of time sufficient to receive the downlink grant after the onDuration ends. Such period may even last until the next onDuration. In any event, such illustrations show that in conventional LTE, the UE may stay awake for significant periods after the onDuration.

Various aspects presented herein provide for different values of parameters than those currently supported in conventional LTE. Such parameter values can be used to create time periods in which no downlink communications are sent to the UE, and no uplink communications are sent from the UE. Various aspects also allow a UE to request such parameters and to initiate configuration of such DRX cycles. In yet another aspect, eNB behavior is changed so that the UE is not expected to transmit on the uplink during periods of silence.

Figure 12:
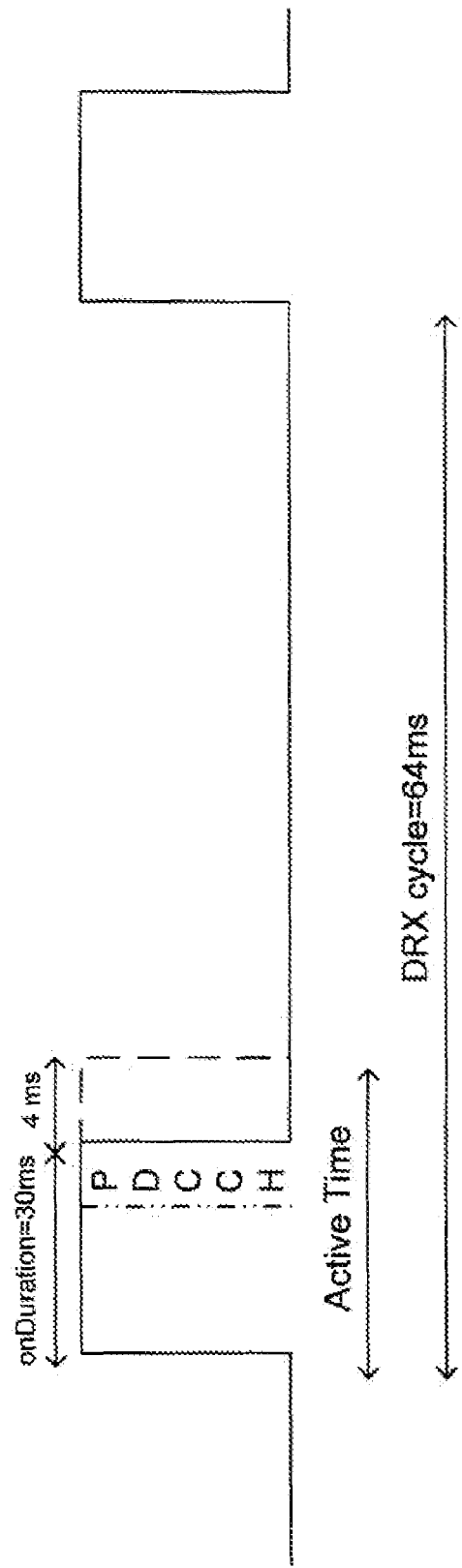
FIG. 12 is a diagram showing a DRX cycle according to one aspect of the present disclosure.

FIG. 12 is an illustration of an exemplary DRX cycle according to one aspect of the disclosure. The shortDRXcycle parameter is zero so that only a long DRX cycle is used. The drx-InactivityTimer and drx-RestransmissionTimer parameters are set to zero to remove the additional active time to wait for downlink grants.

In some cases, four additional subframes are used after the onDuration for an uplink grant received in the last subframe of the onDuration or the PHICH of an uplink transmission in the last subframe of the onDuration. In other words, after the onDuration, the UE receives no more activity grants until the next onDuration. However, if the UE gets an uplink grant, then the UE will send something on the uplink during the 4 ms period after the onDuration.

In one example, the onDuration and 4 ms period following can be used by an LTE radio, while the time until the next onDuration can be used by another radio, such as a Bluetooth or WLAN radio. For instance, in one example based on these settings, LTE and Bluetooth/WLAN can utilize TDM with 34 ms for LTE and 30 ms for Bluetooth/WLAN, out of a 64 ms DRX cycle. Thus, the DRX cycle is shared in approximate halves between LTE and ISM, where the 4 ms period after onDuration is in the range of 1/16 of the DRX cycle length.

In an aspect, if the eNB sends a NACK for any of the last four uplink subframes of onDuration, the HARQ packet can be considered as terminated in error by both eNB and the UE. In other words, if there is an unsuccessful uplink transmission in the last four subframes of the onDuration, then a NACK is sent to the UE four subframes later in the active time. In conventional LTE, the UE will retransmit 4 ms after receiving the NACK; however, in some present aspects, it is desirable for the UE not to transmit after the active period ends. Accordingly, in FIG. 12, the eNB and the UE have negotiated a timeline such that if a NACK is sent to the UE, the UE will not retransmit. The packet is then terminated in error by both the UE and the eNB. Thus, the UE does not transmit after the end of the active period, and the eNB can be made aware that the UE will not retransmit and can accordingly reassign those resources. In some instances, the eNB and the UE may agree on a timeline in which the retransmission is sent in the next onDuration.

Various aspects include eNB behavior that is different than in conventional LTE. For instance, when the eNB receives a request from the UE to configure DRX settings, the eNB can grant the request automatically or after discerning that the UE is in a problematic band.

Furthermore, if the UE sends a Scheduling Request (SR) in the onDuration, the eNB can be configured to provide uplink and downlink grants in the same onDuration. In conventional LTE, there is no deadline for an eNB to send grants in response to a scheduling request. Thus, various aspects respect the DRX cycle by providing grants within the same onDuration.

Additionally, in some instances, it may not be possible or desirable to set the drx-InactivityTimer and drx-RestransmissionTimer parameters to zero. In such cases, the drx-InactivityTimer and drx-RestransmissionTimer parameters can be set to a small value, such as one. However, in conventional LTE, if the drx-InactivityTimer and drx-RestransmissionTimer parameters are non-zero, then it is possible for the eNB to keep the UE awake throughout the entire DRX cycle. Thus, various aspects change the behavior of the eNB. In one example, a request by the UE to set either or both of the drx-InactivityTimer and drx-RestransmissionTimer parameters to one is an indication that the UE has a coexistence situation. Also, when such parameters are set to one, the eNB can be configured not to give any downlink grants or retransmissions past the onDuration.

If the maxHARQTx parameter is set to one on the uplink, then the eNB can be configured not to give new uplink grants past the onDuration. If the maxHARQTx parameter is not set to one, then the eNB can be configured not to give new uplink grants in the last four subframes of onDuration and beyond. Thus, if a NACK is received after onDuration, no retransmission is made.

In other aspects, behavior of the UE is changed. For instance, the UE may send a request to the eNB for DRX parameters that facilitate a TDM solution to a coexistence issue.

Also, the UE can be configured to refrain from sending a SR or a PRACH, even if data is pending during the inactive period of the DRX cycle. Instead, the UE can delay sending the SR or PRACH until the next onDuration. By contrast, in conventional LTE, the UE will typically send an SR or a PRACH within a short time period when data is pending.

In another example, the UE can be configured so that it requests a drxStartOffset parameter that coincides with a SR opportunity. In response, the eNB configures the onDuration to start with an SR opportunity. Thus, the UE does not have to wait to send the SR.

If the above-described changes are not made to conventional LTE, then some updates can be made to approximate the behavior described above. For instance, in a scenario when a UE is compelled to retransmit past the onDuration, rather than simply retransmitting, the CxM within the UE can arbitrate among the various radios to find a solution (e.g., to delay the retransmission until the next onDuration period). Also, a UE can be configured with a CxM that can deny a transmission if the transmission runs afoul of a coexistence parameter.

Returning to FIG. 10, it is noted that a UE may request a DRX configuration in much the same way that a UE may request a measurement gap configuration. Also, the eNB behavior may be similar to that shown in FIG. 10.

Specifically, a new reconfiguration request message 1001 may be added to an LTE communication system and is sent from a UE 1003 to an eNB 1005 to initiate a configuration or reconfiguration of a DRX cycle. A reconfiguration request message 1001 is sent to the eNB 1005 to initiate a DRX cycle configuration, and the message 1001 can include a reason for the request (e.g., Bluetooth ON), a range of requested parameters (e.g., indications of one or more requested values for drx-InactivityTimer, drx-RestransmissionTimer, and the like), and/or any other useful information. The eNB then either grants or denies the request, as shown in scenarios 1010 and 1020, respectively. Also, when an RRC connection is not already in place, a connection request message (not shown) can include much of the information discussed above (e.g., requested parameters, a reason for the request, etc.). The eNB uses the information in the connection request message to know that a coexistence issue exists and to assign a configuration to the UE to reduce or minimize coexistence issues when LTE activity is initiated.

Figure 13:
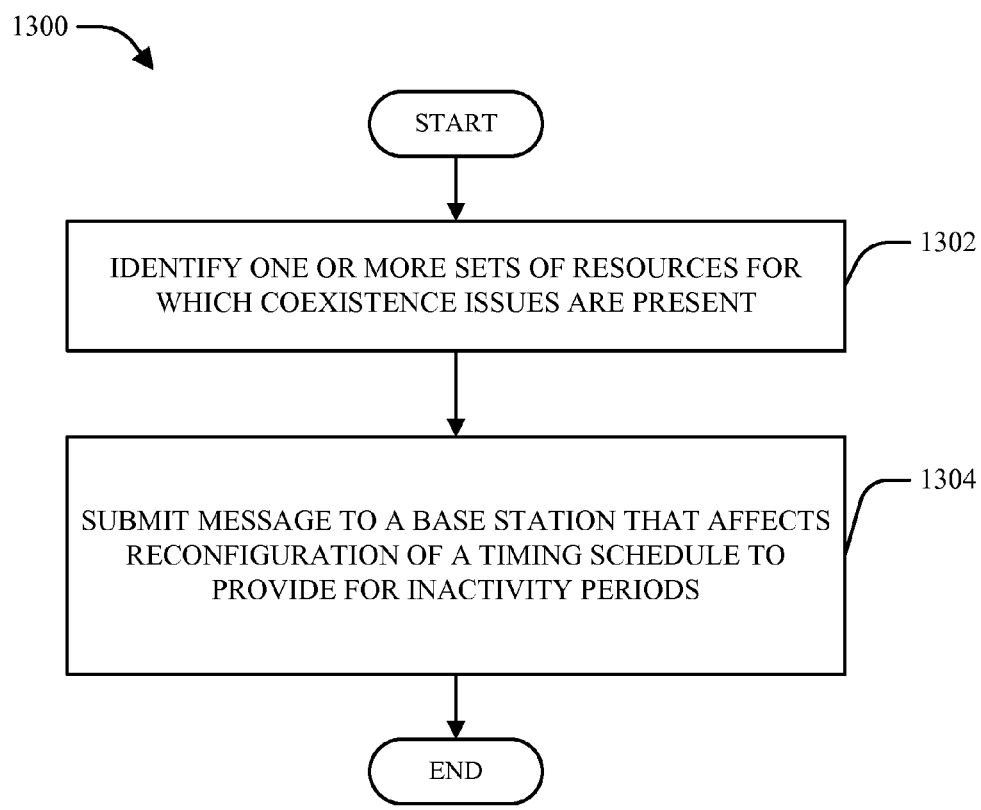
FIG. 13 is a block diagram showing implementation of multi-radio coexistence functionality within a wireless communication system according to one aspect.

FIG. 13 illustrates a methodology 1300 that facilitates implementation of multi-radio coexistence functionality within a wireless communication system. At block 1302, one or more sets of resources for which coexistence issues are present are identified. In any of the methodologies shown in FIGS. 13-17, the identification recognizes that unacceptable performance occurs or is expected to occur due to interference. In one example, a device with multiple radios is equipped to detect interference. Additionally or alternatively, the device may be programmed to know that when certain radios use certain channels, coexistence issues are necessarily present. Additionally or alternatively, the device may be programmed to know that certain radios operating at the same time will necessarily have coexistence issues. Coexistence issues may be identified, e.g., by the CxM 640 of FIG. 6. At block 1304, a message is submitted to a base station that affects reconfiguration of a timing schedule of a first one of the radios to provide for periods of inactivity of the first one of the radios. The inactivity periods providing operating periods for at least a second one of the radios.

Figure 14:
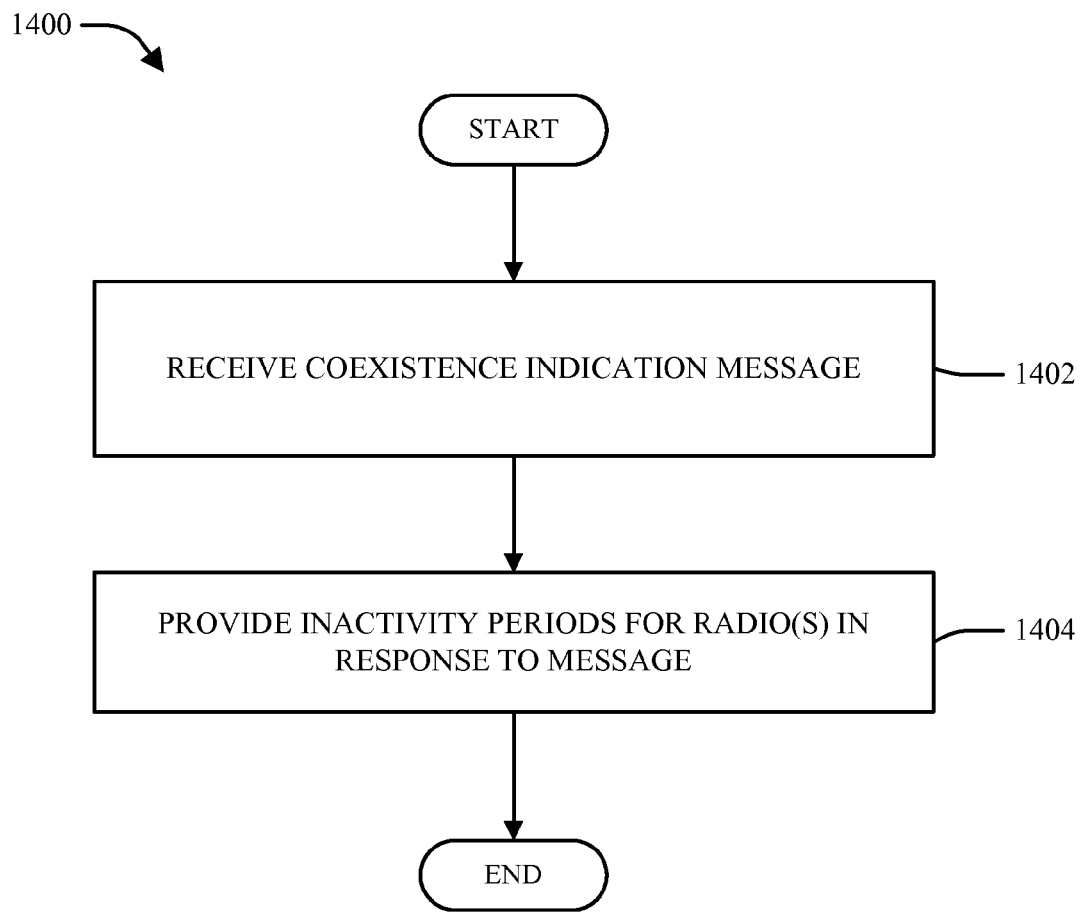
FIG. 14 is a block diagram showing implementation of multi-radio coexistence functionality within a wireless communication system according to one aspect of the disclosure.

FIG. 14 illustrates a methodology 1400 that facilitates implementation of multi-radio coexistence functionality within a wireless communication system. At block 1402, a coexistence indication message is received from a user equipment (UE) having multiple radios. The coexistence indication message indicates a coexistence issue for at least one of the radios of the UE. At block 1404, periods of inactivity are provided for at least one of the radios of the UE, associated with the coexistence issue, in response to receiving the coexistence indication message.

Figure 15:
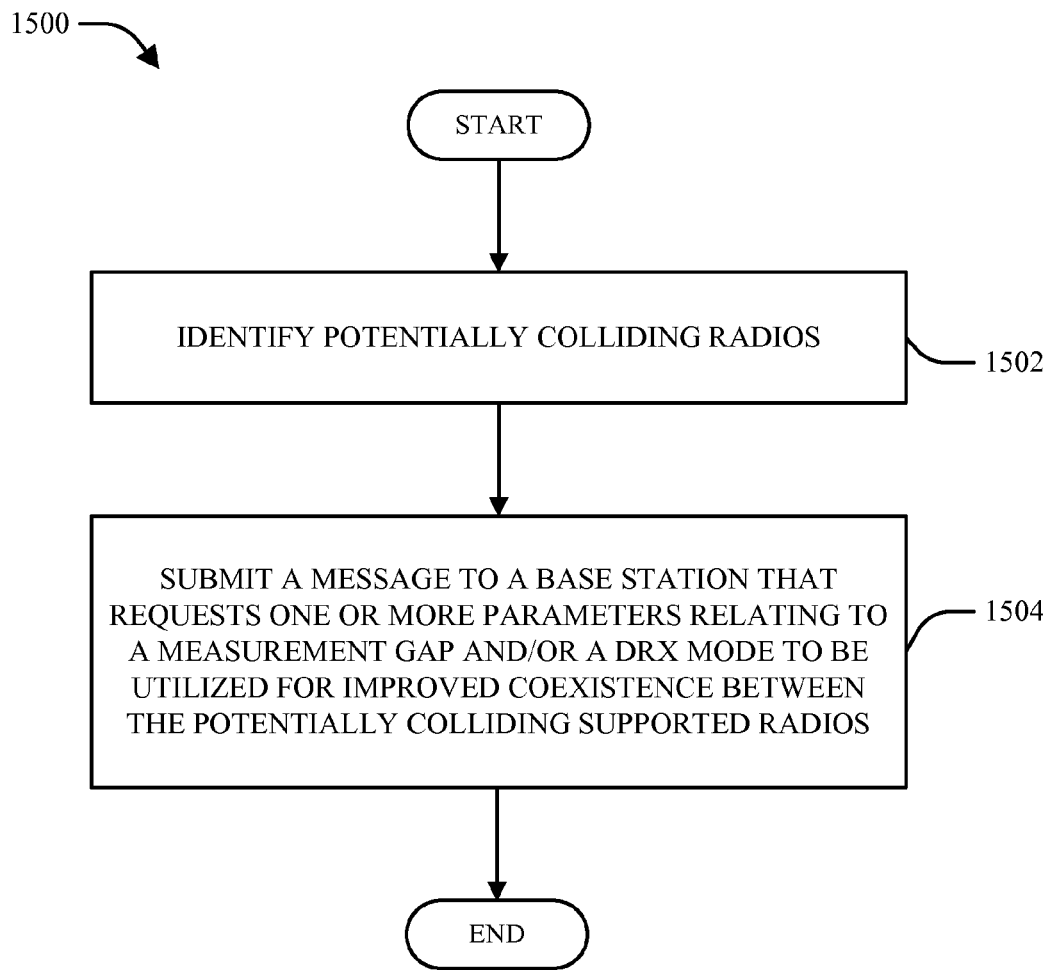
FIG. 15 is a block diagram showing implementation of multi-radio coexistence functionality within a wireless communication system according to one aspect.

FIG. 15 illustrates a methodology 1500 that facilitates implementation of multi-radio coexistence functionality within a wireless communication system. At block 1502, a DRX timeline associated with communication with an eNB is identified. At block 1504, transmissions to the eNB are managed such that transmissions to the eNB beyond a predefined threshold on the DRX timeline are substantially prevented.

Figure 16:
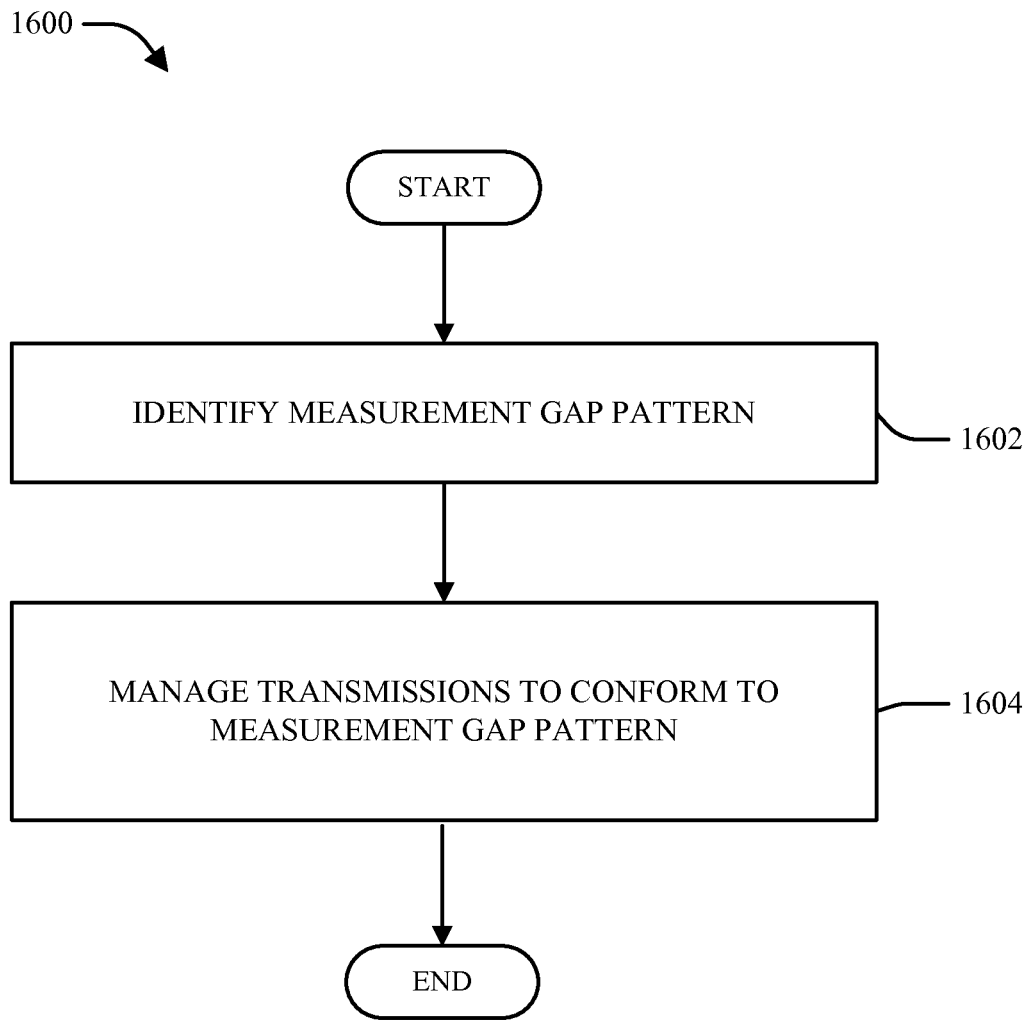
FIG. 16 is a block diagram showing implementation of multi-radio coexistence functionality within a wireless communication system according to one aspect.

FIG. 16 illustrates a methodology 1600 that facilitates implementation of multi-radio coexistence functionality within a wireless communication system. At block 1602, a measurement gap pattern associated with communication with an eNB is identified. At block 1604, transmissions to the eNB are managed such that the transmissions to the eNB conform to the measurement gap pattern.

Figure 17:
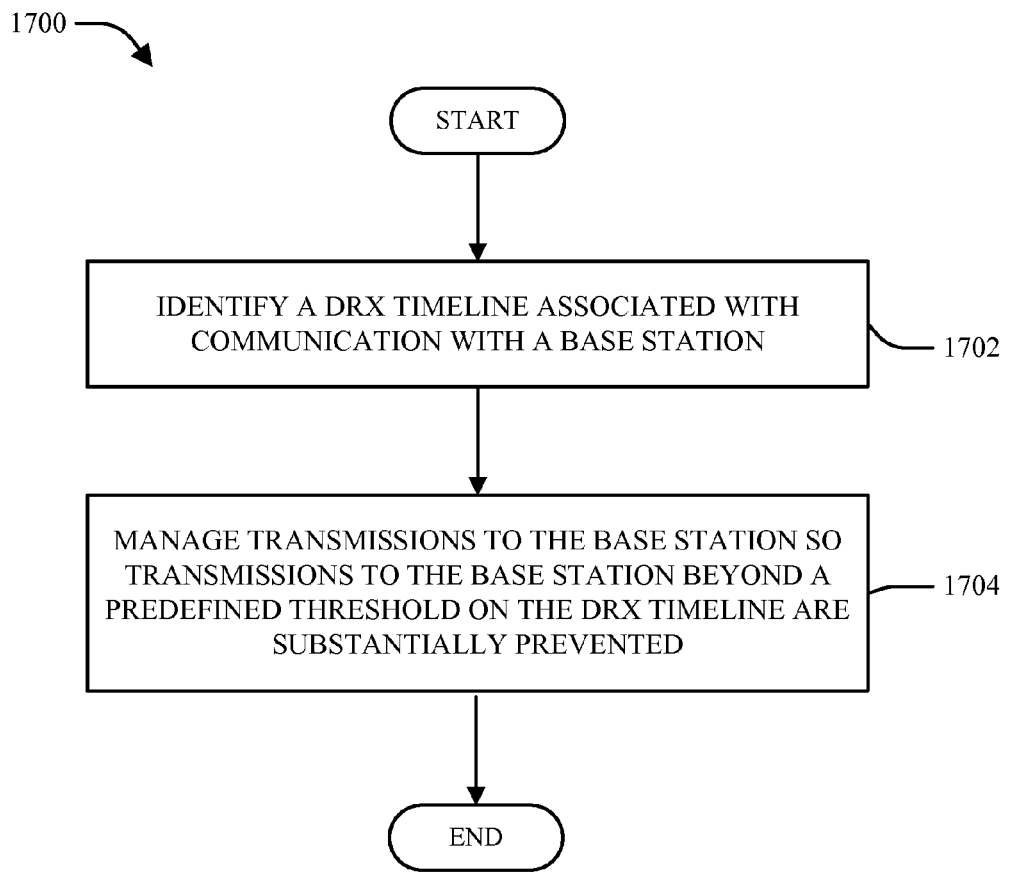
FIG. 17 is a block diagram showing implementation of multi-radio coexistence functionality within a wireless communication system according to one aspect.

FIG. 17 illustrates a methodology 1700 that facilitates implementation of multi-radio coexistence functionality within a wireless communication system. At block 1702, a parameter request message and/or a handover request message is received from a served UE. At block 1704, a set of resources utilized by the served UE is identified. At block 1706, at least one parameter request or handover request received from the served UE is granted upon determining that the set of resources utilized by the served UE is associated with a coexistence issue.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for use in a wireless communication system, the method comprising:
    identifying coexistence issues among a plurality of radios in a User Equipment (UE); and
    submitting a first message to a base station that affects reconfiguration of a timing schedule of a first one of the radios to provide for periods of inactivity of the first one of the radios, the inactivity periods providing operating periods for at least a second one of the radios, in which the first message requests at least one parameter to reconfigure the timing schedule, the at least one parameter configuring the first one of the radios to refrain from sending a Scheduling Request (SR) or Physical Random Access Channel (PRACH) message outside of an onDuration.

2. The method of claim 1, in which the inactivity periods comprise a measurement gap.

3. The method of claim 2, in which the first message configures the measurement gap to have a total length substantially similar to a length of non-measurement gap time.

4. The method of claim 1 in which the at least one parameter configures the first one of the radios so that a starting subframe offset for the onDuration coincides with a Scheduling Request (SR) opportunity.

5. The method of claim 1, in which the submitting comprises providing a Radio Resource Control (RRC) connection reconfiguration request message to the base station when a long term evolution (LTE) transfer is ongoing and communications on a wireless personal area network or wireless local area network (WLAN) become active.

6. The method of claim 1, in which the submitting comprises providing a Radio Resource Control (RRC) connection request message to the base station when a wireless personal area network or wireless local area network (WLAN) communication is ongoing and a long term evolution (LTE) session becomes active.

7. The method of claim 1, further comprising submitting a release indication message for at least one previously requested parameter.

8. The method of claim 1, in which the first message requests at least one parameter to configure a Discontinuous Reception (DRX) mode.

9. The method of claim 8 in which the request for configuration of the DRX mode includes a request for the DRX mode to include substantially no inactivity timer and substantially no retransmission timer.

10. The method of claim 8 in which the request for configuration of the DRX mode includes a request for the DRX mode to include an inactivity timer that is a specified portion of a length of the onDuration.

11. The method of claim 8 in which the request for configuration of the DRX mode includes a request for the DRX mode to include the onDuration and an inactivity timer that have a total length a specified portion of a DRX cycle.

12. The method of claim 8 in which the request for configuration of the DRX mode includes a request for the DRX mode to disable short DRX cycles.

13. The method of claim 8 in which the request for configuration of the DRX mode includes a request for the DRX mode such that when a negative acknowledgment (NACK) is received by the UE in any of a last four subframes of the onDuration, a Hybrid Automatic Repeat reQuest (HARQ) transmission is considered as terminated in error by the UE and the base station.

14. A User Equipment (UE) for use in a wireless communication system, the UE comprising:
a memory; and
a processor coupled to the memory and configured:
to identify coexistence issues among a plurality of radios in a User Equipment (UE); and
to submit a first message to a base station that affects reconfiguration of a timing schedule of a first one of the radios to provide for periods of inactivity of the first one of the radios, the inactivity periods providing operating periods for at least a second one of the radios, in which the first message requests at least one parameter to reconfigure the timing schedule, the at least one parameter configuring the first one of the radios to refrain from sending a Scheduling Request (SR) or Physical Random Access Channel (PRACH) message outside of an onDuration.

15. A computer readable medium tangibly storing program code, comprising:
code to identify coexistence issues among a plurality of radios in a User Equipment (UE); and
code to submit a first message to a base station that affects reconfiguration of a timing schedule of a first one of the radios to provide for periods of inactivity of the first one of the radios, the inactivity periods providing operating periods for at least a second one of the radios, in which the first message requests at least one parameter to reconfigure the timing schedule the at least one parameter configuring the first one of the radios to refrain from sending a Scheduling Request (SR) or Physical Random Access Channel (PRACH) message outside of an onDuration.

16. A wireless communication system, comprising:
means for identifying coexistence issues among a plurality of radios in a User Equipment (UE); and
means for submitting a first message to a base station that affects reconfiguration of a timing schedule of a first one of the radios to provide for periods of inactivity of the first one of the radios, the inactivity periods providing operating periods for at least a second one of the radios, in which the first message requests at least one parameter to reconfigure the timing schedule, the at least one parameter configuring the first one of the radios to refrain from sending a Scheduling Request (SR) or Physical Random Access Channel (PRACH) message outside of an onDuration.

17. A method for communicating in a wireless communication system the method comprising:
receiving a coexistence indication message from a user equipment (UE) having a plurality of radios, the coexistence indication message indicating a coexistence issue for at least one of the radios of the UE and including a request for a discontinuous reception (DRX) mode;
receiving a request message from the UE, the request message requesting reconfiguring of a timing schedule of a first one of the radios to provide for periods of inactivity of the first one of the radios, the inactivity periods of the first one of the radios providing operating periods for at least a second one of the radios;
providing periods of inactivity for at least one of the radios of the UE, associated with the coexistence issue, in response to receiving the coexistence indication message;
identifying a Discontinuous Reception (DRX) timeline associated with the UE; and
granting the request by configuring the timing schedule, the granting comprising abstaining from providing downlink grants to the UE past an onDuration corresponding to the DRX timeline.

18. The method of claim 17, in which the granting further comprises abstaining from providing retransmissions to the UE past the onDuration corresponding to the DRX timeline.

19. The method of claim 17, in which the receiving the request message comprises receiving a Scheduling Request (SR) from the UE during the onDuration, and in which the granting comprises providing a grant of the SR to the UE within the onDuration.

20. The method of claim 17 in which the request is granted upon determining a set of resources utilized by the UE is associated with the coexistence issue.

21. The method of claim 17 in which the granting comprises configuring a measurement gap pattern.

22. The method of claim 21 in which the configured measurement gap pattern has measurement gaps having a total length substantially similar to a length of non-measurement gap times.

23. A method for communicating in a wireless communication system, the method comprising:
- receiving a coexistence indication message from a user equipment (UE) having a plurality of radios, the coexistence indication message indicating a coexistence issue for at least one of the radios of the UE and including a request for a discontinuous reception (DRX) mode;
- receiving a request message from the UE, the request message requesting reconfiguring of a timing schedule of a first one of the radios to provide for periods of inactivity of the first one of the radios, the inactivity periods of the first one of the radios providing operating periods for at least a second one of the radios;
- providing periods of inactivity for at least one of the radios of the UE, associated with the coexistence issue, in response to receiving the coexistence indication message;
- identifying a Discontinuous Reception (DRX) timeline associated with the UE; and
- granting request by configuring the timing schedule, in which the granting comprises abstaining from providing uplink grants to the UE past an onDuration corresponding to the DRX timeline.

24. The method of claim 23, in which the granting comprises abstaining from providing uplink grants to the UE past a time period defined by a predefined number of subframes preceding an end of the onDuration corresponding to the DRX timeline.

25. The method of claim 23, in which the reconfiguration configures the first one of the radios so that a starting subframe offset for the onDuration coincides with a Scheduling Request (SR) opportunity.

26. A wireless communication system, comprising:
- means for receiving a coexistence indication message from a user equipment (UE) having a plurality of radios, the coexistence indication message indicating a coexistence issue for at least one of the radios of the UE and including a request for a discontinuous reception (DRX) mode;
- means for receiving a request message from the UE the request message requesting reconfiguring of a timing schedule of a first one of the radios to provide for periods of inactivity of the first one of the radios, the inactivity periods of the first one of the radios providing operating periods for at least a second one of the radios;
- means for providing periods of inactivity for at least one of the radios of the UE, associated with the coexistence issue, in response to receiving the coexistence indication message;
- means for identifying a Discontinuous Reception (DRX) timeline associated with the UE; and
- means for granting the request by configuring the timing schedule, in which the means for granting comprises means for abstaining from providing downlink grants to the UE past an onDuration corresponding to the DRX timeline.

27. A base station or use in a wireless communication system, the base station comprising:
- a memory; and
- a processor coupled to the memory and configured:
  - to receive a coexistence indication message from a user equipment (UE) having a plurality of radios, the coexistence indication message indicating a coexistence issue for at least one of the radios of the UE and including a request for a discontinuous reception (DRX) mode;
  - to receive a request message from the UE, the request message requesting reconfiguring of a timing schedule of a first one of the radios to provide for periods of inactivity of the first one of the radios, the inactivity periods of the first one of the radios providing operating periods for at least a second one of the radios;
  - to provide periods of inactivity for at least one of the radios of the UE, associated with the coexistence issue, in response to receiving the coexistence indication message;
  - to identify a Discontinuous Reception (DRX) timeline associated with the UE; and
  - to grant the request by configuring the timing schedule by abstaining from providing uplink grants to the UE past an onDuration corresponding to the DRX timeline.

* * * * *